United States Patent [19]

Gaud et al.

[11] Patent Number: 5,250,150
[45] Date of Patent: Oct. 5, 1993

[54] PROCESS FOR PRODUCING READ AND/OR WRITE HEADS FOR MAGNETIC RECORDING

[75] Inventors: Pierre Gaud, Stegreve; Henri Sibuet, Le Fontamil; Alain Persico, Martin d'Heres; Line R. Vieux, Sassenage, all of France

[73] Assignee: Commissariat a l'Energie Atomique, Paris, France

[21] Appl. No.: 836,265
[22] PCT Filed: Jul. 10, 1991
[86] PCT No.: PCT/FR91/00557
  § 371 Date: Feb. 28, 1992
  § 102(e) Date: Feb. 28, 1992
[87] PCT Pub. No.: WO92/02015
  PCT Pub. Date: Feb. 6, 1992

[30] Foreign Application Priority Data

Jul. 11, 1990 [FR] France ............................... 90 08826

[51] Int. Cl.⁵ ..................... H01L 21/306; B44C 1/22; C03C 15/00; C23F 1/00
[52] U.S. Cl. ........................ 156/647; 29/603; 156/643; 156/644; 156/651; 156/657; 156/659.1; 156/662
[58] Field of Search ............... 156/633, 643, 644, 647, 156/651, 654, 657, 659.1, 662; 360/119-121, 122; 29/603; 219/121.68, 121.69

[56] References Cited

U.S. PATENT DOCUMENTS 4,875,970 10/1989 Takeya et al. ................. 156/647 X
5,104,483 4/1992 Takeya ................................ 156/647

FOREIGN PATENT DOCUMENTS 0032230 7/1981 European Pat. Off. .
0262028 3/1988 European Pat. Off. .

OTHER PUBLICATIONS

IBM Technical Disclosure Bulletin, vol. 21, No. 12, May 1979, p. 5002, Armonk, US, K. E. Petersen: "Thin Film Magnetic Heads".
Patent Abstracts of Japan, vol. 11, No. 305 (P-623) (2752), Oct. 6, 1987; and JP-A-6297118 (Hitachi Ltd.) 6 May 1987.
Patent Abstracts of Japan, vol. 14, No. 158, (P-1027) (4101) Mar. 27, 1990; and JP-A-201411 (Sony Corporation) Jan. 18, 1990.
Patent Abstracts of Japan, vol. 13, No. 322 (P-902) (3670), 20 Jul. 1989; and JP A-1088909 (Toshiba Corporation) Apr. 3, 1989.

Primary Examiner—William A. Powell
Attorney, Agent, or Firm—Oblon, Spivak, McClelland, Maier & Neustadt

[57] ABSTRACT

Process for producing red and/or write heads for magnetic recording.

According to the invention, use is made of a monocrystalline substrate (16), which is anisotropically etched in accordance with a crystallographic plane in order to give the gap (48) its precise direction (straight or inclined). The substrate also undergoes thermal oxidation to give the gap a given thickness.

Application to heads for video recording.

10 Claims, 6 Drawing Sheets

PROCESS FOR PRODUCING READ AND/OR WRITE HEADS FOR MAGNETIC RECORDING

TECHNICAL FIELD

The present invention relates to a process for producing magnetic read and/or write heads. It is mainly intended for the production of heads for general public video recording. However, it can naturally be used in other fields, such as that of computer memories.

PRIOR ART

A magnetic recording support for video equipment or for computer memories has numerous tracks on which are written informations in the form of magnetic domains.

In order to increase the recorded information quantity, there is an increase not only in the number of informations per length unit on a track, but also the number of tracks. For this purpose, the width of the tracks is reduced and the distance between the tracks is reduced until the tracks are contiguous.

In order to avoid the mixing of informations relative to two contiguous tracks, the informations are preferably written in an inclined manner on each track, the inclination (or azimuth) being opposed between succeeding tracks. The read and write head must in this case have an inclined gap, whose inclination is a function of the track to be written or read. Thus, an "azimuth" is defined for said gap as being the angle between the plane of the gap and the transverse plane of the head, which is the plane perpendicular to the general direction of the recording support.

Straight or inclined gap heads for video recording can be mechanically obtained by the straight or oblique machining of pole pieces. Such a process is more particularly described in "Recent Magnetics for Electronics", JARECT, vol. 10, chapter 11, pp 121-133, 1983, published by Y. SAKURAI, North-Holland.

However, this production process suffers from the disadvantage of not making it possible to obtain gaps with a width less than 10 microns, which significantly decreases the information density which can be read or written.

However, processes for the production of magnetic heads are known, which make it possible to obtain narrower gaps. These processes use thin film deposition and etching methods. Such a process is e.g. described in EP-A-262 028.

In these processes, the upper magnetic piece in which the gap is formed necessarily has a limited width, because it is one of the films produced. Generally this thickness is less than 5 microns. If the recording support rubs against said piece, the resulting inevitable wear will rapidly destroy the said piece.

Therefore such heads can only be used in systems where the head and recording support are not in contact with one another. Consequently they are unusable for video recording.

However, processes for the production of thin film heads are known, which obviate this disadvantage. These processes also use film deposits, but the head obtained works on the edge, so that the wear affects the largest dimension and not the thickness of the films. In this case, the recording support passes in a plane no longer parallel, but instead perpendicular to the plane of the films. Japanese Patent Abstracts, vol. 13, No. 322 (P-902-3670) of 20.7.1989 corresponding to Japanese application JP-A-1 088 909 describes such a process. According to this document, the starting product is a glass substrate, on which is deposited a conductive coating, e.g. of tungsten, followed by the formation by electrodeposition of a magnetic coating, e.g. of Fe-Ni, part of said magnetic coating is then etched to form a riser which is parallel or inclined with respect to the vertical of the substrate, then deposition takes place by sputtering of an amagnetic material coating such as $SiO_2$, which is etched so as to only leave it on the riser, followed by the formation of a second magnetic coating using the conductive coating as the electrode and then the complete entity is planarized. This gives a magnetic piece separated by a gap corresponding to the $SiO_2$ coating. A protective film e.g. of $Al_2O_3$ is deposited thereon. A hole is made in the entity and a coil is formed through it and around the pole pieces.

Although satisfactory in certain respects, this process still suffers from disadvantages. Thus, the definition of the gap as regards it shape, its thickness and, if appropriate, its inclination lacks accuracy. This is due to the fact that the gap results from an etching operation of the magnetic coating and the sputtering operation, which do not make it possible to obtain the requisite accuracy with respect to the orientation of the gap and with respect to its thickness, which must be approximately 0.2 micron.

DESCRIPTION OF THE INVENTION

The object of the present invention is to obviate these disadvantages. To this end, it proposes a process leading to an extreme accuracy of definition of the gap, both in its orientation (no matter whether straight or inclined) and in its thickness, whilst still obviating the wear problems associated with video recording.

According to the invention these results are achieved by the use of a monocrystalline substrate, whereof use is made of the various crystallographic planes in order to define the edges of the gap. For this purpose, an anisotropic etching takes place of the substrate in order to obtain a surface, whose straight or inclined orientation is perfectly defined. On said surface is carried out a thermal oxidation of the substrate in order to form an amagnetic coating, whose thickness can be strictly controlled through the oxidation process. This gives a perfectly defined gap. It is then merely necessary to form on either side of the said gap, two magnetic coatings which will surround the gap and constitute the magnetic circuit.

The invention more specifically relates to a process for the production of read and/or write heads for magnetic recording, in which, starting with a substrate, on the latter is deposited thin coatings, including a magnetic coating, a magnetic circuit is formed with a gap, in the centre of the magnetic circuit is formed an opening directed perpendicular to the plane of the coating, a conductive wire is wound around the magnetic circuit taking the said opening, the head obtained serving to cooperate with a magnetic recording support placed in front of the gap in a plane perpendicular to the plane of the coatings, said process being characterized in that, to obtain the magnetic circuit with its gap:

use is made of a monocrystalline substrate having crystallographic planes, said substrate having a front face and a rear face oriented in accordance with a first crystallographic plane, the front face of the monocrystalline substrate undergoes anisotropic etching to obtain a lower step, a riser, an upper step, the riser being etched in accordance with a second crystallographic plane forming a given angle with the first crystallographic plane corresponding to the front face of the substrate, at least the riser of the substrate undergoes thermal oxidation, which gives rise to an oxide wall covering the said riser, the upper step is etched, a magnetic coating is deposited on either side of said oxide wall, said magnetic coating is etched to give it the shape of a magnetic circuit with a gap constituted by said oxide wall.

Compared with the prior art described in the aforementioned Japanese patent abstract, it is not the magnetic coating which is etched to define the gap, but the monocrystalline substrate, which is much more precise.

The process according to the invention can be carried out in accordance with numerous variants, as a function of whether the gap is inclined or straight (i.e. with or without an azimuth). When the gap is inclined, numerous variants are possible as a function of whether the sought inclination is given immediately during the anisotropic etching of the monocrystalline substrate, or is obtained at the end of the process by an anisotropic etching of the rear face of the substrate, which makes it possible to fit the head with a certain inclination. Preferably, the monocrystalline substrate use is of silicon.

The present invention also provides numerous arrangements permitting a collective treatment of the heads and in particular an e.g. laser perforating process.

BRIEF DESCRIPTION OF THE DRAWINGS

The invention is described in greater detail hereinafter relative to non-limitative embodiments and with reference to the attached drawings, wherein show.

DETAILED DESCRIPTION OF THE EMBODIMENTS

Figure 1A:
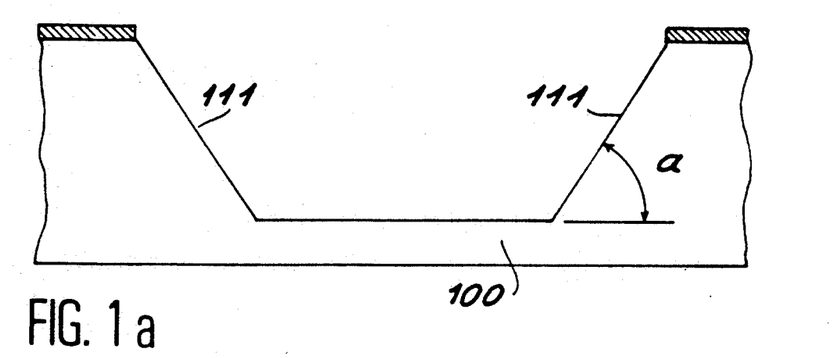
FIGS. 1a to 1c Various crystallographic planes of the silicon.
Figure 1B:
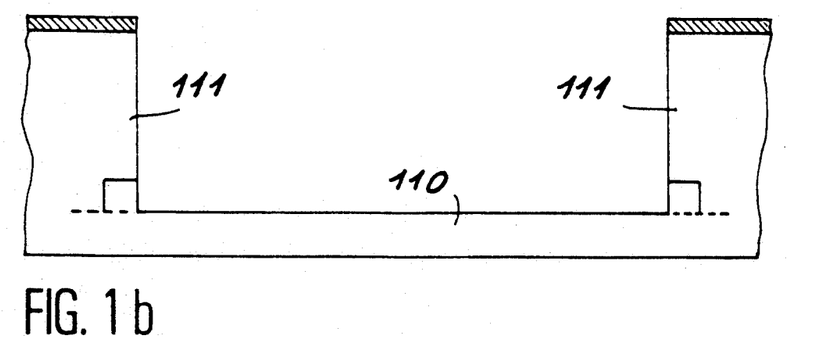
Figure 1C:
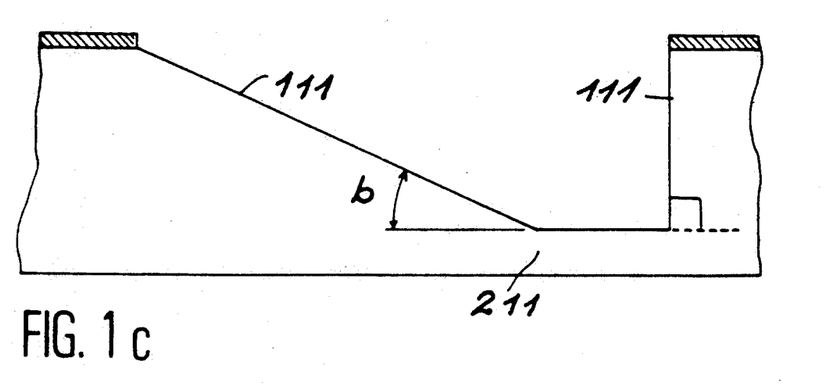

FIG. 1a shows a 100 oriented silicon substrate with two anisotropic etchings according to 111 crystallographic planes. The angle a of said planes with the plane of the substrate is 54.7° (i.e. 35.3° with the vertical to the substrate). FIG. 1b shows a 110 oriented silicon substrate with two anisotropic etchings according to 111 planes perpendicular to the substrate plane. Finally, FIG. 1c shows a 211 oriented silicon substrate and two anisotropic etchings, one in accordance with the 111 plane and the other in accordance with the 111 plane. The first plane forms an angle b of 19.5° with the substrate plane.

Various other orientations of the crystallographic planes and combinations of said planes are possible and the invention is not limited to the use of the illustrated planes. If it is wished to obtain a head with a gap inclined by an angle between 15° and 25°, it would e.g. be possible to use the 211 oriented substrate of FIG. 1c. For heads with a straight gap, it would be possible to use the arrangement of FIG. 1b with a 110 oriented substrate and an anisotropic etching in accordance with 111 planes.

FIGS. 2a to 2i described various stages of a process for producing magnetic heads according to the invention.

Firstly in FIG. 2a, it is possible to see a silicon wafer 10 with a front face 12 on which a plurality of heads has been formed and a rear face 14, which can be used for inclining the gap relative to the recording track, as will be explained relative to FIGS. 4a to 4d.

Figure 2:
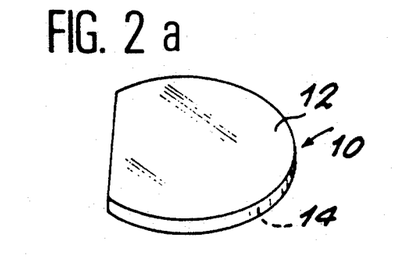
FIGS. 2a to 2i Diagrammatically a sequence of operations according to a first variant of the process according to the invention.

In the variant of FIGS. 2a to 2i, the silicon to be used as the substrate is assumed to have a 112 orientation. This substrate is designated 16 throughout the remainder of the drawings. On said substrate is firstly formed a mask 18, e.g. of $Si_3N_4$ (FIG. 2b).

This is followed by an anisotropic etching of the unmasked part of the substrate 16, so as to obtain a lower step 19, a vertical riser 20 and an upper step 21. This etching can be carried out by chemical etching with KOH. Thermal oxidation makes it possible to obtain a silica coating 22 (FIG. 2c), which is amagnetic. The mask 18 is removed by wet or dry etching.

The following operation (FIG. 2d) consists of an isotropic etching of the upper step 21 up to the level of the lower step, so as to obtain a vertical silicon monoxide wall 24, which will serve as the gap for the head.

The thickness e of the wall 24 will define the gap thickness, which is e.g. a fraction of a micrometer (e.g. 0.2 micron).

In order to have a surface with a uniform composition, the substrate can undergo a further thermal oxidation (FIG. 2e). This is followed by the deposition (FIG. 2f) of a magnetic material 26, e.g. an alloy of Fe-Al-Si (Sendust). This deposition can take place by cathodic sputtering, using an ion beam or by electrochemical deposition.

The magnetic coating 26 is smoothed in such a way that the vertical wall 24 is flush with the surface of the magnetic material 26 (FIG. 2g) and in such a way that the magnetic coating has the desired thickness 1, which can e.g. be 4 microns. The following operation consists of defining the geometry of the magnetic circuit 28 by etching the magnetic material 26 (FIG. 2h).

Numerous components can be produced at the same time on the silicon wafer. FIG. 2i diagrammatically shows, in plan view, the wafer along an approximately 1 mm wide strip.

The various magnetic circuits 28 and the substrate supporting them are then perforated by an opening 34. Moreover, on either side of the strip is formed a notch 36 having a few tenths of a millimetere. The opening 34 and the notches 36 make it possible to produce a conductive wire coil (e.g. of copper). This coil can be produced manually.

The thus formed components are then separated from one another by cutting. In FIG. 2i, the line 39 represents a cutting line. The line 41 shows the profile of the definitive friction surface. This profile can be obtained by laser cutting, as will be explained hereinafter.

Figure 3:
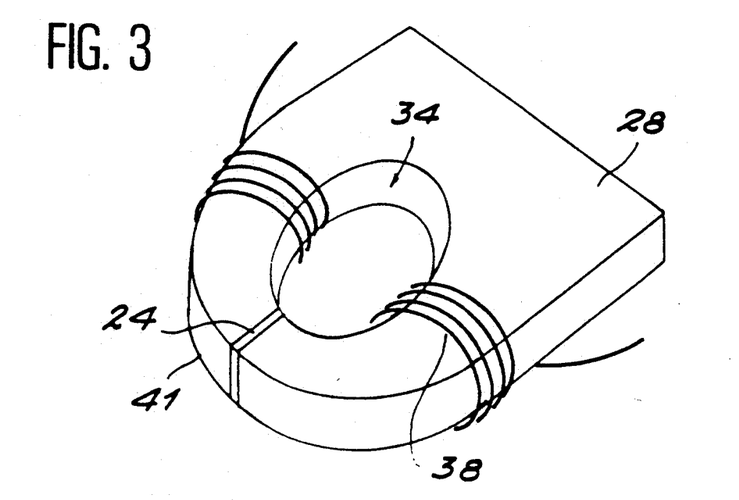
FIG. 3 In perspective, a head obtained according to the process of the invention.

FIG. 3 shows, in perspective, a magnetic circuit 28 with its gap 24 and its coil 38 (the substrate not being shown). The gap can have a thickness of 0.2 μm, height of 5 μm (corresponding to a 5 μm wide track) and a depth of 25 μm. The friction plane of the magnetic tape on the front of the magnetic circuit is designated 41.

If it is wished to obtain an inclined and not a straight gap, the operations described hereinbefore can be followed, after the stage of FIG. 2h, by the operations illustrated in FIGS. 4a to 4d.

Figure 4:
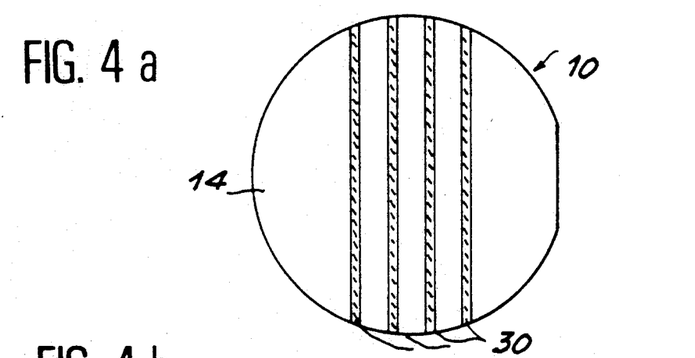
FIGS. 4a to 4d Various stages in the production of a head with an inclined gap and with anisotropic etching of the rear face of the substrate.

FIG. 4a shows the silicon wafer 10 which is turned compared with the position of FIG. 2a, i.e. showing its rear face 14. A silica mask is deposited on said rear face along the tapes 30. In the unmasked zones an anisotropic etching of the silicon takes place (e.g. by chemical etching using KOH) to obtain faces 32 inclined by an angle i compared with the plane of the wafer (FIG. 4b). These faces correspond to the 111 crystallographic plane.

The finally cut strips have an inclined rear face 32 and a front face incorporating the magnetic circuit 28 and its gap 24. Each head is then fixed to a planar support 40 (FIG. 4d), which is itself integral with the read/write apparatus. The magnetic head then has a gap 24 inclined by an angle i relative to the transverse direction of the recording track, which is diagrammatically represented by the reference P in FIG. 4d.

In all these variants, a surface layer called a superstrate can cover the entity in order to obtain a homogeneous upper surface. Like the substrate, said superstrate can be of silicon and can be joined by bonding.

With reference to FIGS. 5a to 5e a description will be given of another variant of the process according to the invention. The inclination of the gap is directly obtained by the anisotropic etching of an inclined plane and not, as in the preceding variant, by the inclination of the magnetic head in accordance with the slope of the rear face of the substrate.

Figure 5A:
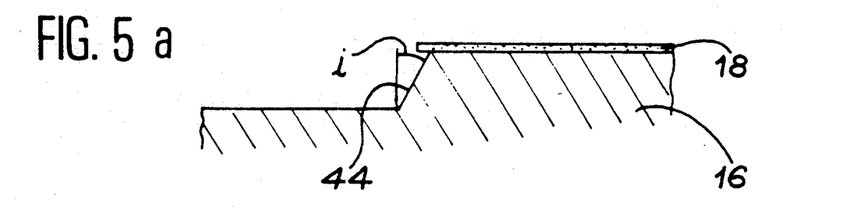
FIGS. 5a to 5e Diagrammatically a sequence of operations according to another variant with an inclined etching of the substrate.

In FIG. 5a, the substrate 16, which can still be of silicon, is oriented according to the 115 crystallographic plane. It is anisotropically etched so as to have a lower step 43, a riser 44 forming an angle i of e.g. 19.5° with the plane perpendicular to the surface of the substrate 16 and an upper step 45. Said anisotropic etching takes place through a mask 18, e.g. of Si$_3$N$_4$, which makes it possible to reserve the upper step.

Figure 5B:
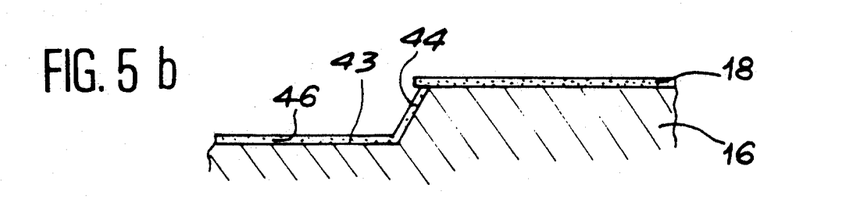

This is followed by the thermal oxidation of the silicon in order to obtain a SiO$_2$ coating 46 on all the surfaces not protected by the mask 18, i.e. on the lower step 43 and on the riser 44 (FIG. 5b).

Figure 5C:
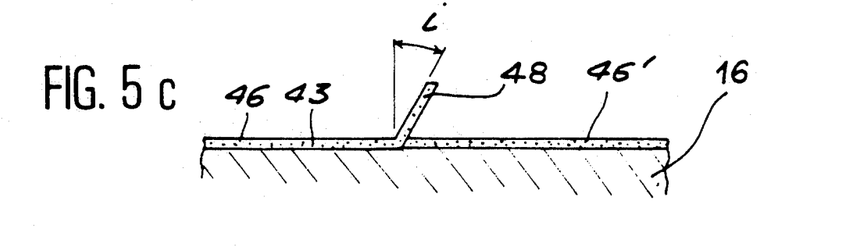

The mask 18 is then removed and the upper step 45 is isotropically etched to be brought to the level of the lower step 43. Thus, a wall 48 is formed, which forms an angle i to the normal to the surface of the substrate 16 (FIG. 5c).

The silicon can undergo a further thermal oxidation in order to obtain a SiO$_2$ coating 46' on the etched part, so that the silica covers the entire substrate surface.

Figure 5D:
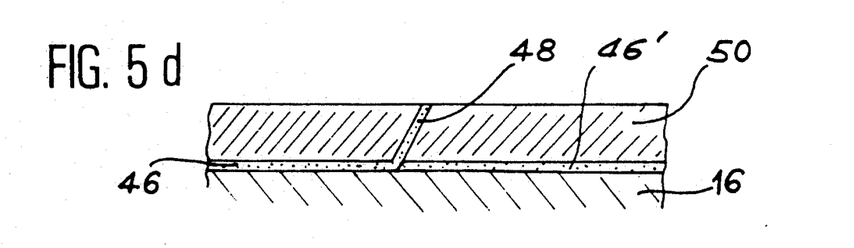

The following operation consists of depositing a magnetic material coating 50, e.g. of Sendust, by cathodic sputtering, ion beam or electrochemical deposition. This magnetic coating is then smoothed in such a way that the wall 40 is flush with the surface of the magnetic coating 50, whilst obtaining the desired thickness for said coating 50, e.g. 4 μm (FIG. 5d).

Figure 5E:
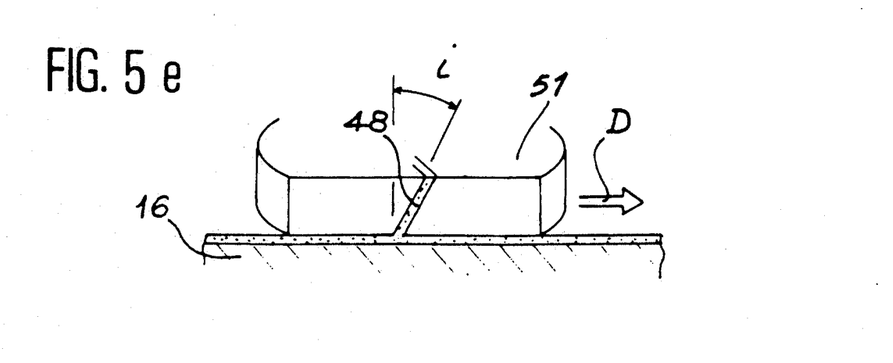

The magnetic circuit 51 is then defined by etching (FIG. 5e). The SiO$_2$ wall 48 will serve as the gap. The not shown track will pass in front of said gap (in accordance with the arrow D). The gap has an inclination or azimuth of value i.

In the same way as described hereinbefore, numerous magnetic heads can be simultaneously produced on the same silicon wafer. Strips having several aligned heads are perforated and equipped with coils. The heads are then separated from one another by cutting.

Figures 6A, 6B:
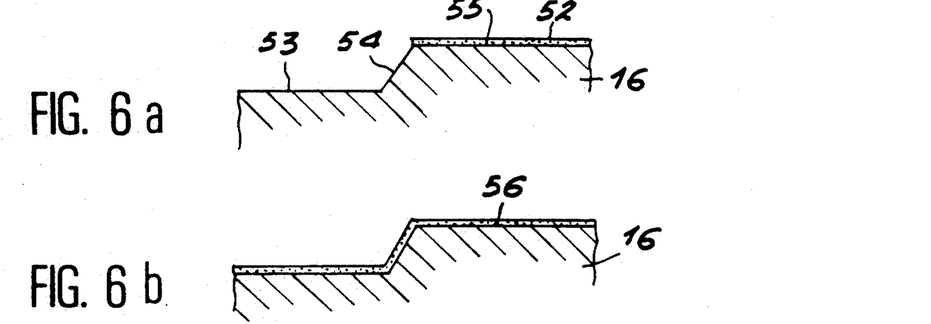
FIGS. 6a to 6g Diagrammatically a sequence of operations according to another variant.
Figure 6C:
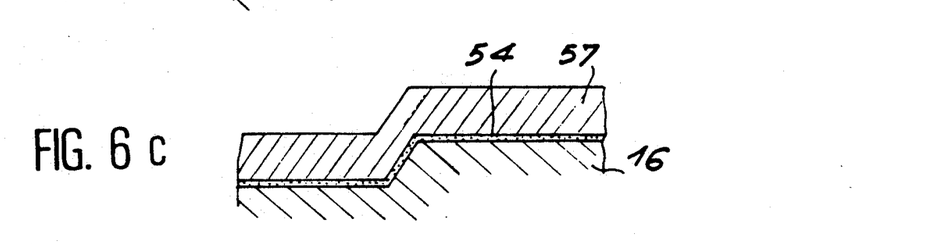
Figure 6D:
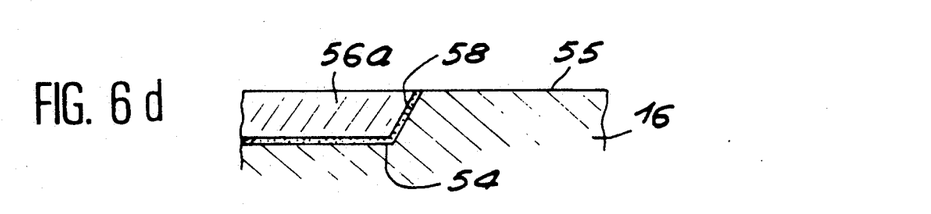
Figure 6E:
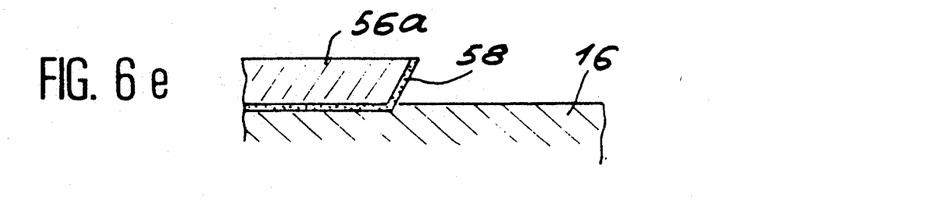

With reference to FIGS. 6a to 6f another variant will be described, once again in the case where an azimuth is directly obtained on the gap. The starting substrate 16 of silicon oriented in accordance with the 115 plane. A resin mask 52 is deposited (FIG. 6a) and anisotropic etching is carried out to obtain a lower step 53, a riser 54 and an upper step 55. The riser 54 is inclined with respect to the vertical and corresponds to a crystallographic plane. The mask 52 is removed and thermal oxidation carried out in order to obtain a silica coating 56 (FIG. 6b). This is followed by a first deposition of magnetic material, e.g. Sendust, so as to obtain a magnetic material coating 57 on the entire surface (FIG. 6c). This coating 57 is smoothed so as to free the silica wall 58, which leaves a magnetic coating 56a. The upper silicon step is then isotropically etched up to the level of the lower portion (FIG. 6e).

Figure 6F:
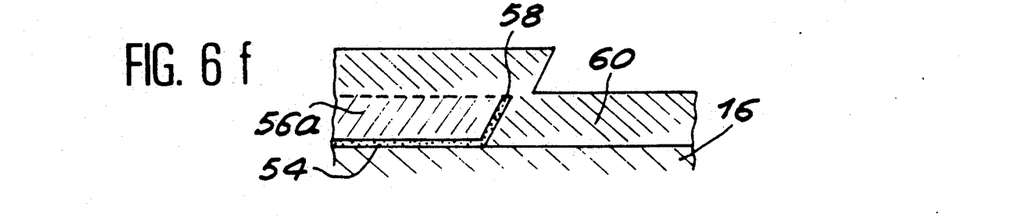
Figure 6G:
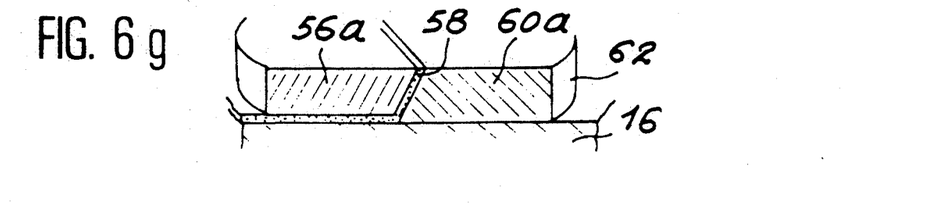

This is followed by a second deposition of magnetic material identical to that of the first deposit, in order to form a coating 60 (FIG. 6f). The coating 60 is then smoothed so as to make it flush with the silica coating 58 and obtain the desired magnetic material thickness. The amagnetic wall 58 then separates a pole piece 56a resulting from the first deposit and a second pole piece 60a resulting from the second (FIG. 6g).

The magnetic material thickness can be controlled by the "square resistance" method, which makes it possible, by a resistance measurement between four points over the entire surface of the deposit, to obtain the thickness of the thin coating through the knowledge of its resistivity.

Etching is then used to define the geometry of the magnetic circuit 62. The sequence of operations (cutting, producing the coil, fitting) is identical to that described hereinbefore for the first two variants.

In the processes described hereinbefore, it is preferable to protect the stack obtained by engaging a superstrate thereon. This procedure is already used in certain types of heads encountered in certain video recording systems. In this application, the superstrate protects the pole pieces from wear caused by the rubbing of the tap on the head.

The process described hereinbefore has an advantage if the head support is a silicon substrate, laser perforation of silicon being possible. Thus, in the performance of the present invention, it is advantageous to connect a superstrate also made from silicon, so that it can be treated in the same way. As an orifice is made for the passage of the coil, it is advantageous to perforate the complete substrate/superstrate assembly.

This operation can either take place on unitary heads, or on strips having several heads, or on the complete silicon wafer. This latter possibility makes it possible to further extend the collective treatment of the heads. In addition, said collective treatment can permit the final shaping of the head, particularly to give it a rounded shape (cf. FIG. 2i or FIG. 3, where the rubbing surface is designated 41) and produce notches in the case of e.g. video heads (notches 36 in FIG. 2i).

No process is known in which an orifice (such as 34 in FIG. 2i) is made by laser through a substrate/superstrate assembly. In addition, no process is known in which the final shape is directly obtained by cutting on the edge. The reason is that the presence of a superstrate leads to a difficulty, namely that of positioning the laser beam at the location where it is wished to carry out the perforation, because the superstrate masks this location.

Figures 7, 8:
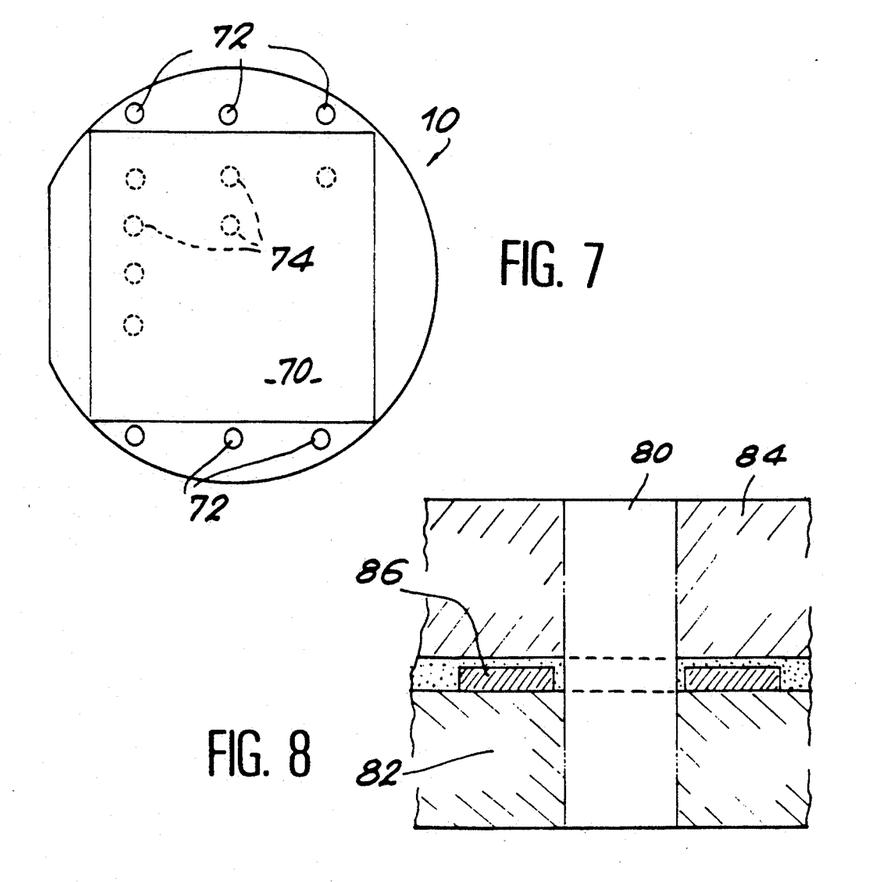
FIG. 7 In plan view, an arrangement for the collective treatment of heads having a substrate and a superstrate.
FIG. 8 In section, the perforating of a substrate-magnetic circuit-superstrate assembly with a laser.

The present invention proposes a marking procedure in the case where the superstrate is engaged on the complete silicon wafer, FIG. 7 describing the process used.

A silicon superstrate 70 is joined by glass welding or bonding to a silicon wafer 10. The superstrate is e.g. square and which is inscribed in the circumference of the wafer. The smaller size of the superstrate compared with the wafer makes it possible to see the marks 72 on the peripheral zones of the wafer. There are at least two such marks, either in the horizontal, or in the vertical direction. They preferably have the same spacing as the patterns to be machined, which are masked by the superstrate and carry the reference 74.

Marks 72 make it possible to know where the patterns 74 are located and to position the laser beam as a function thereof. The displacement of the wafer beneath the laser is programmed to the spacing of the repetition of the patterns. The working sequence is started by positioning the laser beam on the marks. Working then continues automatically on the entire wafer and perforation takes place over all the components 74.

This masking and positioning procedure can be used both for making the orifice for the coil and for the final shaping of the head. The latter operation can be computer assisted.

The laser used can be a neodymium laser emitting a radiation at a wavelength of 1.06 $\mu$m, which is suitable for silicon.

FIG. 8 illustrates the perforation of an orifice 80 in the substrate 82/superstrate 84 assembly. The orifice 80 is made automatically within the magnetic circuit 86, without touching the latter. Once the orifice has been made and the final cutting is completed, the coil is produced manually by passing a conductive wire into the orifice and into the notches.

It should be added that as a result of the use of a laser, whereof the beam size can be as small as 20 $\mu$m, a very clean out is obtained. However, it is necessary to carry out a final polishing of the rounded part of the head on an abrasive support in order to bring about the appearance of the pole pieces and the gap. After all these operations, the magnetic heads obtained are ready to be fitted on the usage apparatus.

We claim:

1. A process for producing a magnetic head for magnetic recording comprising the process steps of
   anisotropically etching a front face of monocrystalline substrate having crystallographic planes and a front face and a rear face oriented in accordance with a first crystallographic plane thereby forming a lower step, a riser, and an upper step, wherein said riser is etched in accordance with a second crystallographic plane so as to form an angle with the first crystallographic plane,
   thermally oxidizing at least said riser thereby forming an oxide wall covering said riser,
   etching said upper step,
   depositing a magnetic coating on both sides of said oxide wall,
   etching said magnetic coating to provide it with the shape of a magnetic circuit having a gap constituted by said oxide wall,
   forming in the center of the magnetic circuit an opening directed perpendicular to the plane of the coating, and
   winding a conductive wire around the magnetic circuit through said opening.

2. The process according to claim 1, wherein said process step of anisotropically etching a front face of monocrystalline substrate having crystallographic planes is carried out in accordance with a second crystallographic plane perpendicular to the first resulting in a gap in the head perpendicular to the plane of the monocrystalline substrate.

3. The process according to claim 1, wherein said process step of anisotropically etching a front face of monocrystalline substrate having crystallographic planes is carried out in accordance with a second crystallographic plane perpendicular to the first crystallographic plane, and further comprising
   anisotropically etching the rear face of the monocrystalline substrate in accordance with a crystallographic plane forming an angle (i) with respect to the rear face, and
   after producing the magnetic head, fixing the etched rear face to a support thereby forming a gap in the head inclined by said angle (i).

4. The process according to claim 1, wherein said process step of anisotropically etching a front face of monocrystalline substrate having crystallographic planes is carried out in accordance with a second crystallographic plane having an angle (i) relative to a plane perpendicular to the first crystallographic plane, to form a gap having an inclination (i) relative to the plane perpendicular to the monocrystalline substrate.

5. The process according to claim 1, wherein said process step of anisotropically etching a front face of monocrystalline substrate takes place through a mask deposited thereon and said process step of thermally oxidizing is carried out in the presence of a mask to provide an oxide coating on the riser and on the lower step, and further comprising
   removing the mask,
   anisotropically etching the upper substrate step to the level of the lower substrate step thereby providing an oxide wall, and
   after depositing the magnetic coating on both sides of the oxide wall, smoothing the magnetic coating until it is flush with the oxide wall.

6. The process according to claim 1, further comprising the process steps of
   depositing a mask on the front face of the substrate prior to anisotropically etching the monocrystalline substrate,
   anisotropically etching the monocrystalline substrate through said mask in order to obtain a lower step, a riser, and an upper step,
   removing the mask,
   thermally oxidizing the monocrystalline substrate in order to produce an oxide coating on the lower step, the riser, and the upper step,
   depositing a first magnetic coating,
   smoothing the magnetic coating until the oxide coating deposited on the riser is revealed, anisotropically etching the upper substrate step until the level of the lower step is reached, depositing a second magnetic coating, smoothing the second magnetic coating until the oxide coating deposited on the riser is revealed.

7. The process according to claim 1, further comprising depositing a protective substrate having the same composition as the monocrystalline substrate on the magnetic circuit of the head thereby forming a protective superstrate-head-substrate assembly.

8. The process according to claim 7, further comprising perforating the protective superstrate, the center of the magnetic circuit, and the substrate by a laser beam.

9. The process according to claim 8, wherein a plurality of heads are formed on a wafer serving as the monocrystalline substrate and a zone of the wafer containing the heads are covered by a single protective superstrate, said single protective superstrate leaving free peripheral zones of the wafer, said zones are formed marks making it possible to locate the heads positioned below the single protective superstrate and said marks are used for positioning the laser beam, the protective superstrate-head-substrate assembly being perforated by a laser beam positioned and displaced from one head to another head.

10. The process according to any one of claims 1 to 9, characterized in that the substrate is a monocrystalline silicon.

* * * * *